Patented Dec. 6, 1927.

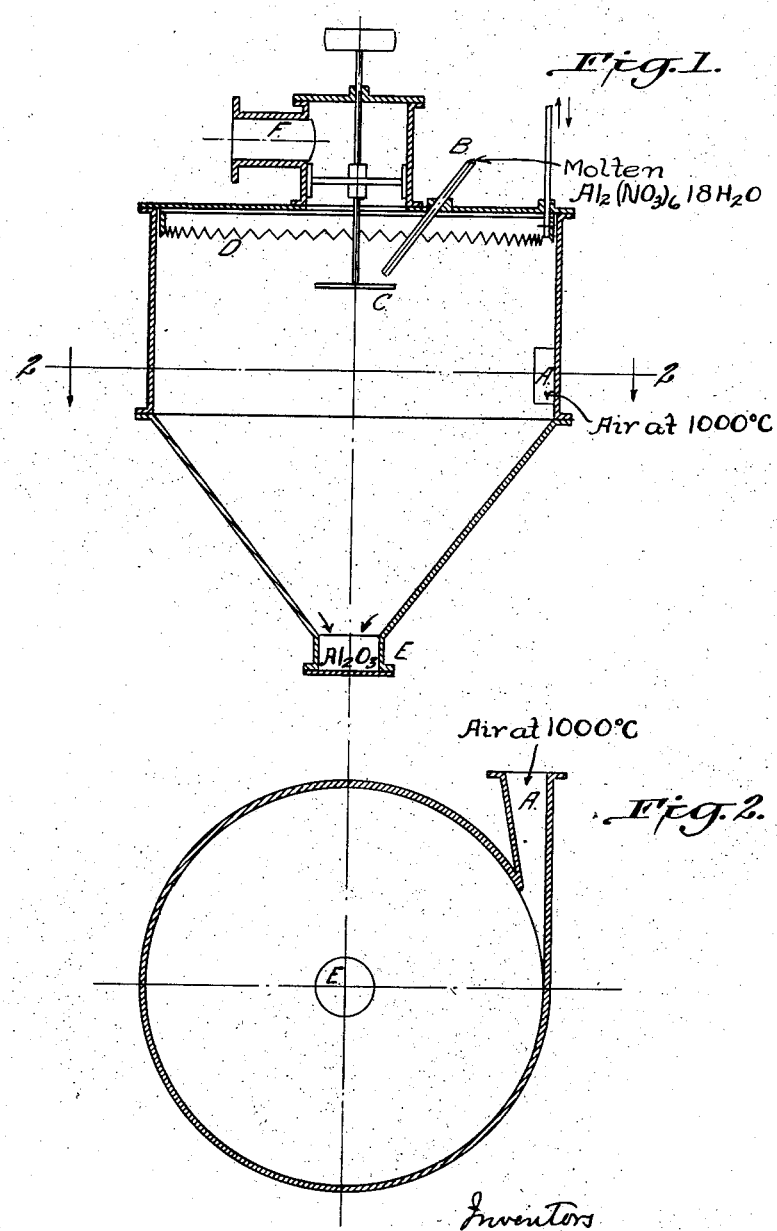

1,652,119

UNITED STATES PATENT OFFICE.

BIRGER FJELD HALVORSEN, OF OSLO, HANS JOACHIM FALCK, OF NOTODDEN, AND ØYSTEIN RAVNER, OF OSLO, NORWAY, ASSIGNORS TO NORSK HYDROELEKTRISK KVAELSTOFAKTIESELSKAB, OF OSLO, NORWAY.

PROCESS FOR THE PRODUCTION OF ALUMINA FROM ALUMINUM NITRATES.

Application filed May 28, 1924, Serial No. 716,498, and in Norway June 13, 1923.

The production of alumina from aluminum nitrate can be effected either by precipitating aluminum hydroxide with bases or by heating the nitrate, for instance, in a rotatory furnace to such a degree that it becomes decomposed, whereby the nitric acid is set free and the aluminum oxide is kept back. There are several drawbacks attached to the latter process, for instance, fritting, which causes the obstruction of the apparatus.

This drawback is avoided, however, in the method that consists of decomposing the aluminum nitrate in a melted solution of alkaline nitrates. But this process has a different drawback, that is, that a comparatively large quantity of alkaline nitrate circulates in the apparatus.

In the present invention the addition of alkaline nitrates is avoided and, in addition, the reaction mass does not melt or become caked, neither does the apparatus become obstructed.

The process consists of the nitrate being converted into spray in a warm current of gas and the aluminum nitrate being decomposed into alumina and nitric acid or nitrous gases, respectively. It can, for instance, be effected by melting the aluminum nitrate in its crystal water and converting the melted solution into spray in a chamber that is pervaded by warm gases. If one has an aluminum nitrate that is mixed with another nitrate, for instance, potassium or calcium nitrate, this mixture melts very easily in its crystal water and can be treated as pure nitrate of aluminum as long as care is taken that the temperature is not so high that aluminate is formed. The temperature of the gases when they enter the chamber may be very high, for instance 1000°, without this having a bad effect on the reaction products, because the temperature of the separate particles is limited by the process of decomposition which consumes heat, so that during the relatively short time they are in contact with the gases, their temperature does not exceed that of decomposition, which should not be more than 400°. Besides, the temperature may easily be regulated either by the quantity of the melted mass or by regulation of the current of gas. If one has a nitrate of aluminum that is greatly mixed with other salts or materials, or if one has basic nitrate of aluminum, these materials can, even if it is difficult to liquefy them, still be treated to advantage by the present process, as the materials can be placed in the decomposing chamber in the form of powder.

In order that the particles shall be in contact with the warm gases for a sufficient space of time it is possible, if it is not desirable to make the chamber more than a certain length, that an arrangement may be made so that the current of gas be tangential and whereby the mass will be caused to follow the current of gas. Another way of lengthening the time during which the material is in contact with the warm gases is by placing shelves or something similar in the chamber or by filling the latter with some kind of packing material. The introduction of the material to be calcined, either in the form of a solution or a powder, can be effected by nozzles or by screws, or it can be converted into dust by compressed air or by other gases.

The most simple form for the chamber is that of a tower the section of which is the shape of a circle.

The aluminum oxide or hydroxide is deposited either in the decomposing chamber itself or in an annexed dust chamber which may be provided with a device for the precipitation of dust. The gases which contain nitric acid and nitrous gases are, when cooled, introduced into an absorption apparatus of the kind used for the absorption of nitrous gases.

A reaction chamber may also be used into which the hot current of air is conducted tangentially so that it moves in the chamber spirally and escapes through a tube that is in the middle of the top of the chamber. The melted or heated aluminum nitrate is introduced onto a rotatory disc in or near the axle of the apparatus and is thereby thrown in the form of spray through the hot current of air, whereby it becomes calcined and falls down into the lower part of the apparatus or it sticks to the sides of the apparatus.

The attached drawing shows an example of such a reaction chamber having a conical bottom.

Fig. 1 is a vertical section of the apparatus with parts appearing in elevation; and Fig. 2 is a horizontal section through the reaction chamber.

Referring to the drawing A is the tube whereby the hot air enters. The melted nitrate enters through tube B and falls down onto the rotatory atomizing disc C. The aluminum oxide that has stuck to the walls is now and then removed by means of the ring D, and is collected in a funnel and taken out through tube E. The gas passes out through tube F.

The reaction chamber ought to be well insulated against loss of heat and should be lined inside with fireproof brick.

The following may be given as an example of how the method may be effected:—

A mixture of 20 per cent $KNO_3$ and 80 per cent $Al_2(NO_3)_6 18H_2O$ is heated to 70° C. whereby it melts in the crystal water and is conducted onto the atomizing disc. An apparatus, 3 metres in diameter, is suitable for an amount of salt of 500 kilogrammes per hour and 1400 kilogrammes of hot air per hour can be blown into the apparatus at a temperature of 1000° C.

Instead of air heating gases may be used or hot nitrous gases from the electric furnace, or other hot gases.

We claim:

1. Process for the production of alumina from aluminum nitrates comprising heating the nitrate, converting it into spray and conducting it into a chamber pervaded by hot gases.

2. Process for the production of alumina from aluminum nitrates comprising heating the nitrate, converting it into spray and conducting it into a chamber into which hot air is conducted tangentially.

3. A process for the production of alumina from aluminum nitrate, comprising introducing aluminum nitrate in the form of a finely divided suspension into a reaction chamber, and subjecting the suspension to the action of hot gases until the decomposition of the aluminum nitrate is effected.

In testimony whereof, we affix our signatures.

BIRGER FJELD HALVORSEN.
HANS JOACHIM FALCK.
ØYSTEIN RAVNER.